3,549,607
HIGH CIS POLYPENTENAMERS

Giulio Natta, Gino Dall'Asta, and Giorgio Mazzanti, Milan, Italy, assignors to Montecatini Edison S.p.A., Milan, Italy, a corporation of Italy
No Drawing. Continuation-in-part of application Ser. No. 339,455, Jan. 22, 1964. This application Dec. 27, 1968, Ser. No. 787,622
Claims priority, application Italy, Apr. 10, 1963, 7,421/63
Int. Cl. C08f 5/00
U.S. Cl. 260—93.1      4 Claims

ABSTRACT OF THE DISCLOSURE

High molecular weight stereoregular high cis-polypentenamers are disclosed.

---

This application is a continuation-in-part of our application Ser. No. 339,455 filed Jan. 22, 1964.

THE PRIOR ART

There have been disclosed both binary copolymers of ethylene and cycloolefins or alkyl-cycloolefins, and ternary copolymers of ethylene, higher alpha-olefins, and cycloolefins produced with the aid of catalysts prepared from, e.g., a vanadium compound and an aluminum alkyl, in contact with which catalysts the cycloolefins or alkyl-cycloolefins copolymerize by opening of the double bond thereof and thus retain their cyclic structure. In the binary copolymers, the cycloolefins are present in the form of cycloalkylenic units and are, therefore, free of any olefinic double bonds. The terpolymers, on the other hand, contain a small amount of unsaturation due to opening of the ring in a small fraction of the total number of cycloolefins units accepted into the copolymer macromolecule during the copolymerization reaction.

In addition, because of steric hindrance difficulties, the cycloolefins and alkyl-cycloolefins having at least five carbon atoms in the ring cannot be enchained with each other to form sequences of cycloalkylenic groups. Because of this difficulty, it was thought to be impossible to obtain homopolymers of such cycloolefins andalkyl-substituted cycloolefins.

THE PRESENT INVENTION

It was found, quite unexpectedly, and as disclosed in our parent application that cyclopentene can be homopolymerized by completely opening the ring and maintaining the double bond of the monomer. The polymerization of cyclopentene, by opening of the cycloolefin ring, can be carried out at such moderate temperatures that a thermo, and thus streically disordered, decomposition of the cycloolefinic ring can be avoided. It was found, in fact, that the monomeric units in the homopolymers are substantially in the form of pentenylenic units. These polymers correspond to a structure which can be characterized by the following general formula:

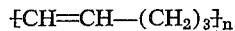

(wherein $n$ is the average polymerization degree).

Polymers consisting essentially of monomeric units having this type of structure are referred to as polypentenamers in accordance with the nomenclature proposed by J. L. Huggins, Journal of Polymer Science 8 (1952), page 257.

Considering the stability of the five carbon-atom rings, and the ease with which they copolymerize with ethylene while maintaining their cyclic structure, it was quite surprising that cyclopentene can be polymerized with opening of the ring instead of by opening of the double bond. Moreover, it was not known, nor could it be foreseen, that the cyclopentene rings could be opened in a stereospecific manner with production of a homopolymer in which the double bonds have substantially a cis, or substantially a trans structure.

It was discovered that by selecting a specific catalytic system for the polymerization, and by operating under particular process conditions, it is possible to prepare cyclopentene homopolymers having the above mentioned structure of polypentenamers wherein substantiantially all of the double polypentenamers wherein substantially polymers in which substantially all of the double bonds have a trans structure, i.e., homopolymers which can be defined as having a substantially, or an essentially, stereoregular structure.

The present application is concerned, more particularly, with our high cis polypentenamers. The value for the percentage of cis double bonds in these polymers can be obtained by determining the cis-unsaturation of the infrared spectrum band at 7.11 microns, using $CCl_4$ solutions and the absorption coefficient $0.84.10^4$ moles$^{-1} \times$ cm.$^{-1} \times$ ml. Said value, so determined, is generally at least 90%.

The high cis polypentenamers of this invention are amorphous and non-crystallizable under any conditions and at any temperatures down to 0° C. and generally occur as elastic solids, being rarely in tacky or waxy form. In the latter case, they are generally polymers having a low molecular weight. The preferred polymers have molecular weights in excess of several thousand and may exceed several hundred thousand. The intrinsic viscosity of these homopolymers, as determined in toluene, may range between 0.3 and 6.0 (100 cc./gram). In many instances, the intrinsic viscosity may be outside said range.

The cis-polypentenamers are soluble in various solvents, including, for example, the aromatics, e.g., benzene or toluene, the aliphatics or naphthenics, e.g., n-heptane or decalin; the chlorinated hydrocarbons, e.g. chloroform or carbon tetrachloride; and various other known solvents. The cis-polypentenamers are generally insoluble in certain other solvents including the alcohols, e.g., methanol and ethanol; the glycols, e.g., ethylene glycol; the aliphatic ketones, e.g., acetone, and are only partially soluble in ether.

The high cis-polypentenamers often lose the property of being soluble in solvents of the type mentioned within a relatively short time, due to cross-linking of the double bonds in the macromolecular chains. This cross-linking is favored by the presence of catalyst residues, by high temperatures, and by exposure of the polymers to air, oxygen, or light. The homopolymers purified by removal of the catalyst residues can be subjected to light, air, or oxygen and still remain stable. It appears that the purified homopolymers may undergo some cross-linking only after being exposed to air, oxygen, or light for long periods of time. Small amounts of antioxidants, such as phenylbetanaphthylamine and hydroquinone prevent cross-linking and thus stabilize the homopolymers against light and other atmospheric conditions. The amount of antioxidant used can range from about 0.1 to 5 parts by weight per thousand parts by weight of the homopolymers.

Homopolymers having a substantially, or essentially, regular steric structure, and more specifically those wherein the double bonds have substantially or essentially a cis or trans structure can be characterized by infrared absorption spectra. By the spectra, it is possible to attribute a specific chemical structure to the two different types of homopolymers.

In the accompanying drawing the single figure represents the infrared spectrum of an essentially linear homopolymer having essentially cis structure (bands at 7.1–7.2 and at 13.8–13.9 microns), the monomer units being dirived by opening of the cyclopentene ring.

The spectrum shows no bands of appreciable intensity which can be attributed to a cyclic structure.

Such bands should appear at 3.78 microns and in the zone of 8.0–8.5 microns.

These high cis polypentenamers distinguish over any polypentenamers reported previously as having a substantial cis content in that these polymers are not only amorphous on X-ray examination but are non-crystallizable under any condition at any temperature down to 0° C., including stretching for orientation.

The homopolymers can be vulcanized also with sulphur or sulphur doners, due to the presence of the double bonds in the polymeric chain. The rate of cross-linking, during vulcanization, and the degree of cross-linking, depends mainly on the type and amount of vulcanizing agent used.

All of the conventional agents and methods used for vulcanizing natural and synthetic rubbers may be used to vulcanize the present high cis-polypentenamers. More particularly, the agents used to vulcanize polymers built up of conjugated dienes, such as sulfur with known accelerators, can be used in vulcanizing these cyclopentene homopolymers.

The catalysts used to obtain the present high cis-polypentenamers are prepared from molybdenum pentachloride and aluminium trialkyls and more particularly aluminum triethyl. Particularly outstanding results were obtained using aluminum trialkyls including $Al(C_2H_5)_3$; $Al(i-C_4H_9)_3$; and $Al(n-C_6H_{13})_3$. Although the molar ratio of molybdenum salt to aluminum trialkyl is not a limiting parameter, a ratio in the range from about 1 to 0.1 to 1 to 100 is preferred. Good results can be obtained by operating with molybdenum salt/aluminum trialkyl molar ratios in the range 1 to 0.5 to 1 to 5.

The relative amount of molybdenum salt to cyclopentene can be varied within wide limits. Preferably, the molar ratio is in the range 1:100 to 1:5000.

The catalytic systems which produce high cis polypentenamers which are amorphous and non-crystallizable under any conditions include the following:

$$MoCl_5 + Al(C_2H_5)_3$$

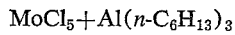

$$MoCl_5 + Al(n-C_6H_{13})_3$$

For instance, using the catalytic system

$$MoCl_5 + Al(C_2H_5)_3$$

or $Al(n-C_6H_{13})_3$, the number of cis double bonds in the polypentenamer obtained exceeds 95% of the total double bond content of the homopolymer. The stereospecificity of the catalyst may be increased by using the higher monomer to molybdenum salt ratios within the range given. For example, using a $MoCl_5 + Al(C_2H_5)_3$ system in which the Mo/Al molar ratio was 1:2.5, and a cyclopentene/$MoCl_5$ molar ratio of 1000:1, we obtained a polypentenamer having a cis double bond content of 97–99.5% with respect to the total double bond content.

The catalyst is preferably prepared just prior to use in the polymerization, at a temperature the same as, or lower than, the polymerization temperature. The catalyst can be prepared in an inert diluent such as, for example, an aliphatic, cycloaliphatic, or aromatic hydrocarbon. Suitable specific diluents include n-heptane, n-pentane, petroleum ether, cyclohexene, benzene, toluene, etc. Diluent may be used. Also, in many cases, an extranous diluent may be omitted, and the catalyst may be prepared in the monomer at a temperature the same as, or lower than, the polymerization temperature, thus avoiding the ageing of the catalyst and addition thereof to the monomer and dilution of the mixture with inert medium. By operating in this manner, it is possible to achieve a higher homopolymerization rate and thus a higher conversion of the monomeric cyclopentene to homopolymer. Polymerization may be carried out in the presence of the above diluents or in absence of any diluent, opening in mass.

In a preferred embodiment, the cyclopentene is held under nitrogen, in the absence of humidity, at a temperature below or equal to the polymerization temperature and preferably not higher than 30° C., the molybdenum pentachloride is introduced, with addition of the organometallic aluminum compound and while the mixture is stirred vigorously. On addition of the cyclopentene, the polymerization starts immediately.

It is also possible to carry out the polymerization at a temperature higher than that at which the catalyst is prepared.

The catalyst may be supported. The preferred supports include metal oxides which cannot be chemically modified. A particularly suitably support is alumina.

The polymerization temperature may range from −60° C. to 0° C. Particularly good results were obtained at temperatures in the range −40° C.

The polymerization can be continued until almost all of the cyclopentene is polymerized. However, to avoid cross-linking and insolubilization of the homopolymer, it is advisable to interrupt the polymerization when 20 to 60% of the starting monomer has been converted to homopolymer, the remaining unpolymerized cyclopentene being usable in a subsequent polymerization run. For this reason, it is preferred to perform the polymerization continuously by separating the homopolymer formed and recycling the monomer, possibly (if necessary) after addition of further catalyst amounts. The polymerization time, e.g., the time required for conversion to a certain amount of the starting monomer to homopolymer, varies depending on whether or not a diluent is used, on the specific catalyst, and on the polymerization temperature. In general, the polymerization time may range from less than 30 minutes to over ten hours.

While the mechanism by which the catalysts used herein polymerize cyclopentene is not completely understood, it has been found that cyclopentene is not polymerized by a catalytic complex acting by a cationic mechanism, e.g., by either titanium tetrachloride or diethyl aluminum chloride. Likewise, catalysts capable of forming a free radical at relatively low temperatures, e.g. catalyst systems containing cupric chloride and triethyl aluminum in n-heptane, were found ineffective for cyclopentene polymerization. Therefore, it can be concluded that the catalyst systems used to obtain the present high cis-polypentenamers cannot be considered as being cationic or free-radical forming.

The polymerization of cyclopentene is carried out with the exclusion, so far as possible, of oxygen, $CO_2$, water and other atmospheric reagents, and under a nitrogen atmosphere. Also, other operations, such as the preparation and handling of the catalytic mixture, should be carried out under dry nitrogen.

The high-polypentenamers of the invention are useful in the elastomer field.

The following examples are illustrative of the invention.

EXAMPLE I

The polymerization vessel consists essentially of a flask provided with an agitator, a nitrogen inlet tube and an inlet tube for the reactants.

A dry nitrogen atmosphere was formed in the flask and 10 cc. (7.7 g.) of chromatographically pure cyclopentene was introduced. In a separate flask, kept under dry nitrogen, a catalytic mixture was prepared as follows. About 3.6 millimols of molybdenum pentachloride were dissolved in 30 cc. of anhydrous n-heptane cooled to −30° C. About 8 millimols of aluminum trihexyl were then slowly added to the mixture while agitating by means of a magnetic agitator. The catalytic mixture was siphoned, under nitrogen pressure, into the polymerization flask kept at −30° C. The flask was closed and the mixture was agitated at −30° C. for 20 hours. The Al/Mo ratio was 2.5:1 and the monomer/Mo molar ratio was about 30:1.

About 5 cc. of n-butanol and 20 mg. of phenylbetanaphthylamine were added and the reactioin mixture was poured into 200 cc. of methanol which contained 5 cc. of 38% hydrochloric acid.

The polymer was precipitated and dried under nitrogen and then dissolved again in 50 cc. methanol which contained 2 cc. of 38% hydrochloric acid and 20 mg. of phenylbetanaphthylamine. The mother liquor was decanted, the polymer was suspended in fresh methanol, the suspension was filtered, the polymer was washed further with methanol and then finally dried under reduced pressure at room temperature. About 2.1 g. (corresponding to a conversion of 27%) of an elastic non-tacky polymer were obtained. It had an intrinsic viscosity, as determined in toluene at 30° C., of 0.6 (100 ml./g.). The polymer appeared to be soluble in aliphatic, cycloaliphatic, aromatic and chlorinated hydrocarbons and insoluble in the lower alcohols and in acetone. The polymer had an infrared absorption spectrum from which was evident the presence of approximately one cis-double bond (bands at 7.10 and 13.9 microns) per each monomeric unit and almost complete absence of other types of double bonds (trans, vinyl, vinylidene, conjugated or cumulated double bonds). Cyclic structures, methyl groups and long methylenic sequences were also absent. The polymer obtained had the structure of a polypentenamer.

EXAMPLE II

The polymerization vessel consisted on a flask of the type described in Example I. The catalyst was prepared in the flask. After the formation of an inner atmosphere of dry nitrogen, 20 cc. (15.4 g.) of anhydrous cyclopentene and, after cooling to −30° C., 1.5 millimols of molybdenum pentachloride were introduced.

About 3.75 millimols of triethyl aluminum were then added to the mixture, while vigorously stirring. The Al/Mo ratio was 2.5:1. The momomer/Mo molar ratio was about 150:1. The polymerization of the cyclopentene was carried out at −30° C. for three hours, when it was stopped by the addition of 5 cc. of n-butanol containing 20 mg. of phenylbetanaphthylamine. The polymer formed was dissolved under nitrogen in 100 cc. of toluene cooled to 0° C. After repeated filterations, the toluene solution was poured into 500 cc. of methanol containing 10 cc. of 38% hydrochloric acid.

The polymer was precipitated, dried under nitrogen and then dissolved in 100 cc. of benzene. The mother solution was decanted. The polymer was suspended in fresh methanol, filtered, washed further with methanol and finally dried under reduced pressure at room temperature.

About 3.3 g. (corresponding to a conversion of 21%) of an elastic polymer were isolated. It had an intrinsic viscosity, determined in toluene, at 30° C., of 0.9 (100 ml./g.). It had solubility properties very similar to those of the polymer described in Example I. The polymer had the infrared absorption spectrum shown in the drawing. It appears from the spectrum that there was approximately one double bond of the cis type (about 95%) per each monomeric unit. Double bonds of other types, e.g., vinyl, vinylidene, conjugated or cumulated were essentially absent. Except for the trans-double bonds (about 5%); cyclic structures, methyl groups, and long methylenic sequences were also absent.

The polymer obtained substantially had the structure of a cis polypentenamer. The polymer was vulcanized for 60 minutes at 150° C. with a mix consisting of

| | Parts by weight |
|---|---|
| Polymer | 100 |
| Sulfur | 1.75 |
| Vulca for HBS | 1.0 |
| ZnO | 5.0 |
| Stearic acid | 1.0 |

The vulcanized product was a rubber having physical and mechanical properties similar to those of natural rubber. This rubber is particularly useful in the low temperature field e.g. down to −120° C.

EXAMPLE III

Cyclopentene was polymerized as in Example II, using the following amounts of monomer and components of catalytic mixture.

10 cc. (7.7 g.) of anhydrous cyclopentene
0.11 millimol of molybdenum pentachloride
0.28 millimol of aluminum triethyl The Al/Mo molar ratio was 2.5:1. The monomer/Mo molar ratio was about 1000.1. The polymerization was carried out at −30° C. for six hours. After purification as described in Example II, about 1.5 g. (corresponding to a conversion of 19%) of the polymer were obtained. It was a solid, rubberlike mass, soluble in hydrocarbons, e.g., benzene and n-heptane; chlorinated hydrocarbons, e.g., carbon tetrachloride; and in many other solvents. It was insoluble in alcohols, e.g., methanol; ketones, e.g., acetone; and partially insoluble in ethers, e.g., diethyl ether.

The infrared absorption spectrum indicated a cis double bond content of 97–98%. Other types of double bonds were essentially absent. The polymer was a highly stereoregular cis polypentenamer.

EXAMPLE IV

Cyclopentene was polymerized as described in Example II, using;

10 cc. (7.7 g.) of anhydrous cyclopentene
0.28 millimol of molybdenum pentachloride
2.8 millimols of aluminum tri-hexyl The Al/Mo molar ratio was 10:1. The monomer/Mo molar ratio was about 400:1. The polymerization was carried out at −30° C. for three hours. After purification as described in Example II, about 0.8 g. (corresponding to 10% conversion) of polymer was obtained. It was a solid, rubberlike mass having properties substantially similar to those of the polymer of Example III. Its intrinsic viscosity in toluene at 30° C. was 7.6 (100 cc./g.).

The infrared absorption spectrum indicated a cis double bond content of 95–96%. Trans double bonds were present only in small amounts (4–5%). Other types of double bonds were substantially absent. The polymer had essentially the structure of a cis polypentenamer.

The invention has been illustrated in terms of specific embodiments, and changes and variations in details can be made in practicing the same, without departing from its spirit. Therefore, we intend to include in the scope of the appended claims all such modifications as will be obvious to those skilled in the art from the description and examples given herein.

What is claimed is:

1. High molecular weight polypentenamers, said polymers being characterized by the structure

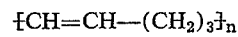

wherein $n$ is the average polymerization degree in which the double bonds are substantially of the cis type, and in being amorphous and non-crystallizable under any conditions at any temperature down to 0°C.

2. High molecular weight cyclopentenamers according to claim 1 having essentially cis structure bands at 7.1–7.2 and 13.8–13.9 microns.

3. The process for producing high cis polypentenamers which are amorphous and non-crystallizable under any conditions at any temperature down to 0° C. which comprises polymerizing cyclopentene at a temperature range between −60° C. and 0° C., in contact with a catalyst prepared by mixing molybdenum pentachloride and an aluminum trialkyl.

4. The process according to claim 2, further characterized in that the aluminum trialkyl is aluminum triethyl, and the molar ratio of the monomer to molybdenum is from 100:1 to 5000:1.

References Cited

UNITED STATES PATENTS 3,366,616  1/1968  Tietz _____ 260—93.1
3,330,815  7/1967  McKeon et al. _____ 260—93.1

JOSEPH L. SCHOFER, Primary Examiner

R. A. GAITHER, Assistant Examiner